(12) United States Patent
Naidu et al.

(10) Patent No.: US 9,284,895 B2
(45) Date of Patent: Mar. 15, 2016

(54) METHODS AND APPARATUSES FOR DIAGNOSING LEAKS IN A COMPRESSED NATURAL GAS DELIVERY SYSTEM

(71) Applicants: Srini Naidu, Northville, MI (US); Michael Cottrell, White Lake, MI (US)

(72) Inventors: Srini Naidu, Northville, MI (US); Michael Cottrell, White Lake, MI (US)

(73) Assignee: FCA UA LLC, Auburn Hills, MI (US)

( * ) Notice: Subject to any disclaimer, the term of this patent is extended or adjusted under 35 U.S.C. 154(b) by 220 days.

(21) Appl. No.: 13/658,123

(22) Filed: Oct. 23, 2012

(65) Prior Publication Data
US 2014/0111327 A1 Apr. 24, 2014

(51) Int. Cl.
| | |
|---|---|
| G08B 21/00 | (2006.01) |
| B60Q 1/00 | (2006.01) |
| F02M 21/02 | (2006.01) |
| F02M 69/04 | (2006.01) |
| F02B 43/00 | (2006.01) |
| B65B 31/00 | (2006.01) |
| B67C 3/00 | (2006.01) |
| G01M 3/00 | (2006.01) |
| G01M 3/02 | (2006.01) |
| G01M 3/28 | (2006.01) |
| F02D 19/02 | (2006.01) |
| F02D 41/00 | (2006.01) |
| F02D 19/06 | (2006.01) |
| F02D 41/22 | (2006.01) |

(52) U.S. Cl.
CPC ............ F02D 19/021 (2013.01); F02D 19/027 (2013.01); F02D 19/0647 (2013.01); F02D 41/0027 (2013.01); F02D 2041/225 (2013.01); F02D 2200/0602 (2013.01); F17C 2221/033 (2013.01); F17C 2223/0123 (2013.01); Y02T 10/32 (2013.01)

(58) Field of Classification Search
CPC .......... F02D 2041/225; F02D 19/0647; G08B 21/20
USPC ................................................... 340/605, 450
See application file for complete search history.

(56) References Cited

U.S. PATENT DOCUMENTS

| | | | | |
|---|---|---|---|---|
| 4,646,940 | A * | 3/1987 | Kramer et al. | 222/1 |
| 5,988,206 | A | 11/1999 | Bare et al. | |
| 6,202,478 | B1 * | 3/2001 | Blomquist et al. | 73/49.7 |
| 6,240,910 | B1 * | 6/2001 | Maekawa et al. | 123/529 |
| 6,467,466 | B1 * | 10/2002 | Maekawa et al. | 123/529 |
| 7,621,178 | B2 * | 11/2009 | Perinet et al. | 73/149 |
| 2003/0066565 | A1 | 4/2003 | Hoang | |
| 2004/0154596 | A1 * | 8/2004 | Mitani et al. | 123/509 |
| 2008/0125930 | A1 * | 5/2008 | Johnson | 701/29 |
| 2009/0088983 | A1 * | 4/2009 | Bauer et al. | 702/24 |
| 2010/0206054 | A1 * | 8/2010 | Sasaki | 73/40.7 |
| 2010/0332363 | A1 * | 12/2010 | Duddle et al. | 705/34 |

* cited by examiner

*Primary Examiner* — Mohamed Barakat
(74) *Attorney, Agent, or Firm* — Ralph E. Smith

(57) ABSTRACT

Methods and systems for detecting a leak in a compressed natural gas (CNG) delivery system of a vehicle are disclosed. According to some embodiments the method includes determining a first amount of CNG in a CNG tank of the vehicle, the first amount corresponding to a first time, and determining a second amount of CNG in the CNG tank at a second time, the second time being subsequent to the first time. The method further includes determining an expected CNG consumption of the vehicle during a period of time, the period of time beginning at the first time and ending at the second time. The method also includes determining an actual CNG consumption during the period of time based on the first amount of CNG and the second amount of CNG, and comparing the actual CNG consumption and the expected CNG consumption to determine whether a leak has occurred.

8 Claims, 8 Drawing Sheets

METHODS AND APPARATUSES FOR DIAGNOSING LEAKS IN A COMPRESSED NATURAL GAS DELIVERY SYSTEM

FIELD

The present disclosure relates to various techniques for diagnosing leaks in a compressed natural gas delivery system of a vehicle.

BACKGROUND

As natural gas is becoming a viable alternative energy source to oil, a move towards manufacturing vehicles powered by compressed natural gas (CNG) is gaining momentum. In order to store CNG in a fuel tank, the CNG is pressurized and stored in a CNG tank of the vehicle. The CNG is delivered to a vehicle engine by a CNG delivery system. Generally, the CNG delivery system depressurizes and injects the CNG into the vehicle engine.

SUMMARY

According to various embodiments of the present disclosure, a method for detecting a leak in a compressed natural gas (CNG) delivery system of a vehicle is disclosed. The method includes determining a first amount of CNG in a CNG tank of the vehicle, the first amount corresponding to a first time, and determining a second amount of CNG in the CNG tank at a second time, the second time being subsequent to the first time. The method further includes determining an expected CNG consumption of the vehicle during a period of time, the period of time beginning at the first time and ending at the second time. The method also includes determining an actual CNG consumption during the period of time based on the first amount of CNG and the second amount of CNG, and comparing the actual CNG consumption and the expected CNG consumption to determine whether a leak has occurred.

According to various embodiments of the present disclosure, a method for detecting a leak in a compressed natural gas (CNG) delivery system of a vehicle is disclosed. The method includes determining a first CNG pressure measurement at a predetermined section in the CNG delivery system at a first time and obtaining a second CNG pressure measurement at the predetermined section. The second CNG pressure measurement is indicative of a CNG pressure measurement taken at a second time. The second time is previous to the first time and corresponding to when the vehicle was last turned off. The method also includes determining an actual pressure difference based on the first CNG pressure measurement and the second CNG pressure measurement and determining a first ambient temperature at the first time. The method further includes obtaining a second ambient temperature corresponding to the second time, the second ambient temperature corresponding to when the vehicle was last turned off. The method further includes determining an ambient temperature difference based on the first ambient temperature and the second ambient temperature, the ambient temperature difference being indicative of a change in temperature from the second time to the first time. The method also includes determining an expected pressure difference based on the ambient temperature difference and comparing the actual pressure difference with the expected pressure difference to determine whether a leak has occurred.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
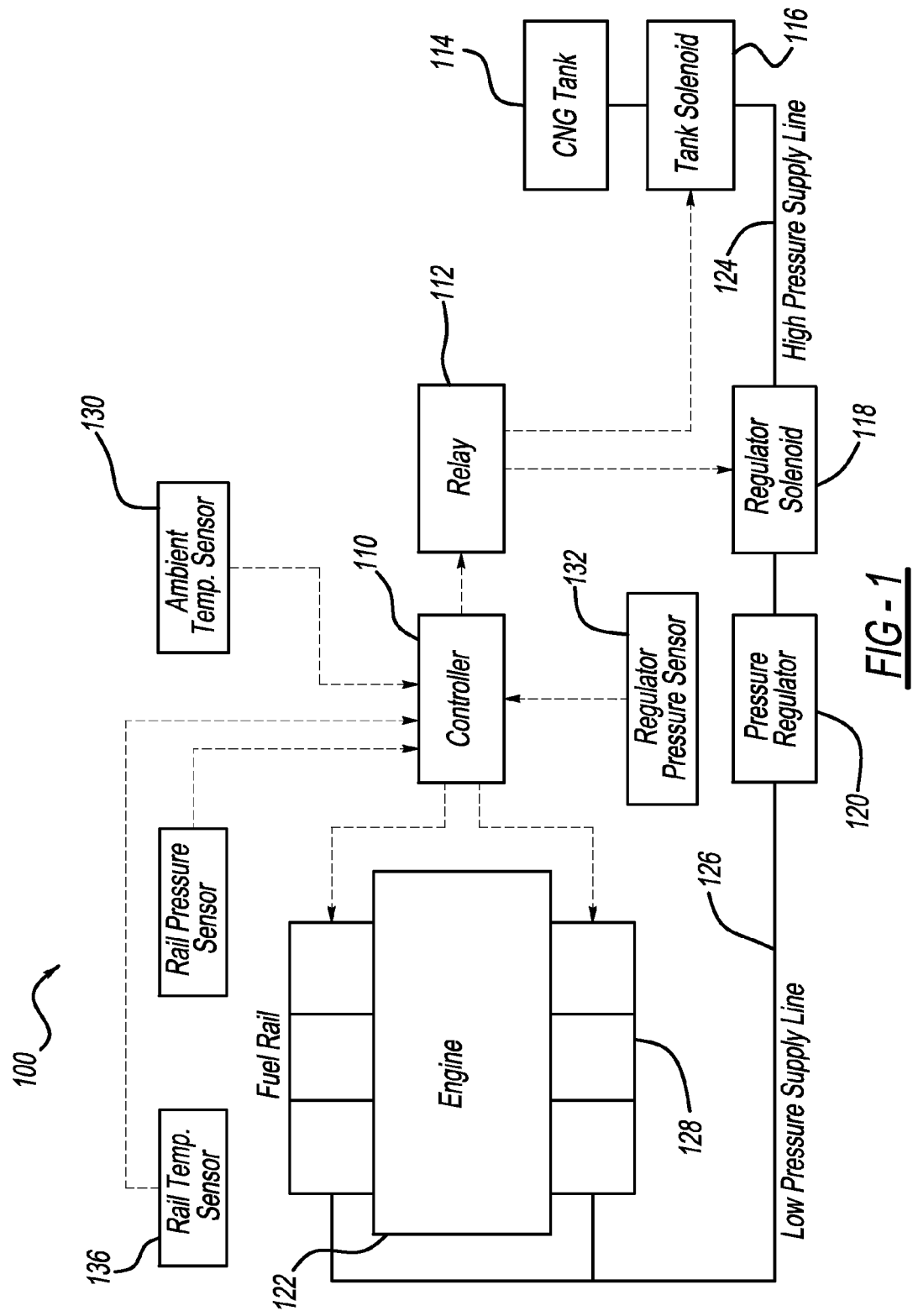
FIG. 1 is a component block diagram illustrating an exemplary compressed natural gas delivery system according to some embodiments of the present disclosure.

Referring now to FIG. 1, an exemplary compressed natural gas (CNG) delivery system 100 is disclosed. The CNG delivery system 100 includes, but is not limited to, a controller 110, a relay 112, a CNG tank 114, a tank solenoid 116, a regulator solenoid 118, a pressure regulator 120, and an engine 122. The CNG is delivered from the CNG tank 114 to the engine 122 via a high pressure supply line 124, a low pressure supply line 126, and a fuel rail 128. The CNG delivery system 100 may further include one or more of an ambient temperature sensor 130, a regulator pressure sensor 132, a rail pressure sensor 134, and a rail temperature sensor 136.

The controller 110 can include one or more processors operating in a serial or parallel manner and memory (e.g., random access memory or read only memory) storing processor-executable instructions for causing the controller 110 to perform its intended functionality when executed by the one or more processors, including diagnosing leaks in the CNG delivery system 100. In the illustrative embodiment, the controller 110 is configured to control the delivery of CNG to the engine 122 by providing a control signal to the relay 112. Upon receiving the control signal, the relay 112 energizes the tank solenoid 116 and the regulator solenoid 118. When energized, the tank solenoid 116 and the regulator solenoid 118 are opened, thereby allowing CNG to flow from the CNG tank 114 to the pressure regulator 120 via the high pressure supply line 124. As shown, the CNG delivery system 100 includes one CNG tank 114 and one tank solenoid 116. It should be appreciated that the term "CNG tank" 114 includes configurations having one or more CNG tanks and the term "tank solenoid" 116 includes configurations having one or more tank solenoids.

The pressure regulator 120 receives CNG pressurized at a first pressure from the CNG tank 114 and outputs CNG pressurized at a second pressure to the fuel rail 128 via the low pressure supply line 126. As should be appreciated, the CNG stored in the CNG tank 114 may be pressurized at a higher pressure, e.g., 3600 psi, than the CNG that is injected into the engine 122, e.g., 150 psi. In some embodiments, the temperature of the pressure regulator 120 can be regulated such that the CNG is depressurized to a suitable output pressure. The depressurized CNG is provided to the fuel rail 128 and injected into the engine 122 by one or more fuel injectors (not shown) coupled to the fuel rail 128. In the exemplary embodiment, the controller 110 controls the fuel injectors by providing a control signal commanding the fuel injectors to inject the CNG into the engine 122. Each time the fuel injectors inject CNG into the engine 122, the CNG delivery system 100 is said to have completed an "engine cycle." It should be the term "engine cycle" can include other definitions as well. For example, when the engine 122 completes 720 degrees of revolution, the engine 122 may be said to have completed an "engine cycle."

Figure 2:
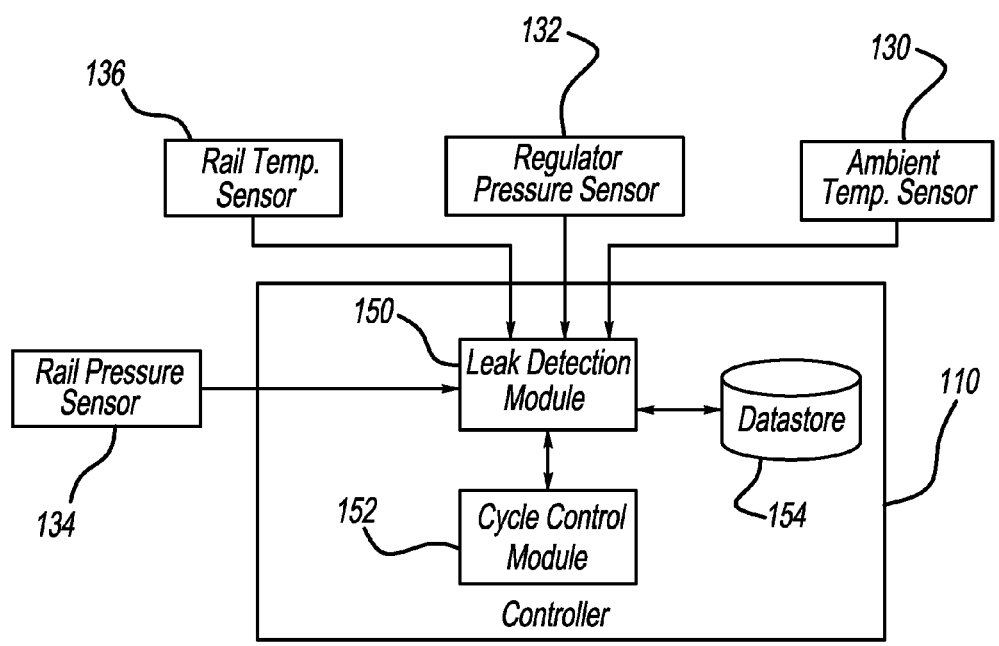
FIG. 2 is a component block diagram illustrating an exemplary controller according to some embodiments of the present disclosure.

In the illustrative embodiment, the controller 110 is configured to perform leak detection. FIG. 2 illustrates an example controller 110 configured to detect a leak within the CNG delivery system 100. The controller 110 can include, but is not limited to, a leak detection module 150, a cycle control module 152, and a datastore 154. It should be appreciated that the list of components is not intended to be limiting. Other components can be included in the controller without departing from the scope of the present disclosure.

The leak detection module 150 receives input directly or indirectly from one or more of the ambient temperature sensor 130, regulator pressure sensor 132, the rail pressure sensor 134, the cycle control module 152, and the datastore 154 to diagnose a leak within the CNG delivery system 100. As will be apparent from the description below, the leak detection module 150 can be implemented according to perform one or more techniques described below to diagnose a leak within the CNG delivery system 100.

The ambient temperature sensor 130 outputs a signal indicating an ambient temperature of the air at or near the vehicle. The regulator pressure sensor 132 outputs a signal indicating a pressure of CNG at the high pressure supply line 124 side of the pressure regulator 120. The rail pressure sensor 134 outputs a signal indicating a pressure of CNG at the fuel rail 128. The rail temperature sensor 136 outputs a signal indicating a temperature of the CNG in the fuel rail 128. The foregoing sensors are provided for example and the leak detection module 150 may receive signals from other sensors as well.

In some embodiments, the cycle control module 152 controls the fuel injectors at the fuel rail 128. The cycle control module 152 can control the fuel injectors either directly or indirectly via an injector relay (not shown) that affects the pressure at the low pressure supply line 126. In the illustrative embodiment, the cycle control module 152 further controls the relay 112 that affects the pressure at the high pressure supply line 124. In some embodiments, the cycle control module 152 provides an indication of each engine cycle to the leak detection module 150. According to some embodiments described below, the leak detection module 150 can be configured to determine an expected amount of CNG consumption over a period of time based upon the number of engine cycles initiated by the cycle control module 152.

The datastore 154 can include one or more memory devices (e.g., a hard disk drive or a flash memory drive) that store data. The leak detection module 150 can utilize the data stored in the datastore 154 to diagnose a leak in the CNG delivery system 100. According to some embodiments of the disclosure, the datastore 154 can store one or more lookup tables defining expected pressure changes as functions of fluctuations in ambient temperatures. In some embodiments, the datastore 154 can store one or more pressure profiles defining expected pressure values over a period of time at a specific location. In some embodiments, the pressure profiles can be adjusted over time by a learned parameter in order to take into account the response of a relay as the relay ages. The learned parameter can be determined using known techniques.

Additionally or alternatively, the datastore 154 may store other data including parameter values that can be used to diagnose leaks in the CNG delivery system 100. It is noted that leak detection module 150 or other components executed by the controller 110 may be configured to measure and store many different parameter values in the datastore 154 when the vehicle is being operated or when the vehicle is turned off. Included in the parameter values that can be stored in the datastore 154 are an ambient temperature when the engine 122 was last turned off, a CNG pressure at the high pressure supply line 124 when the engine 122 was last turned off, and a CNG pressure at the fuel rail 128 when the engine 122 was last turned off.

Figure 3:
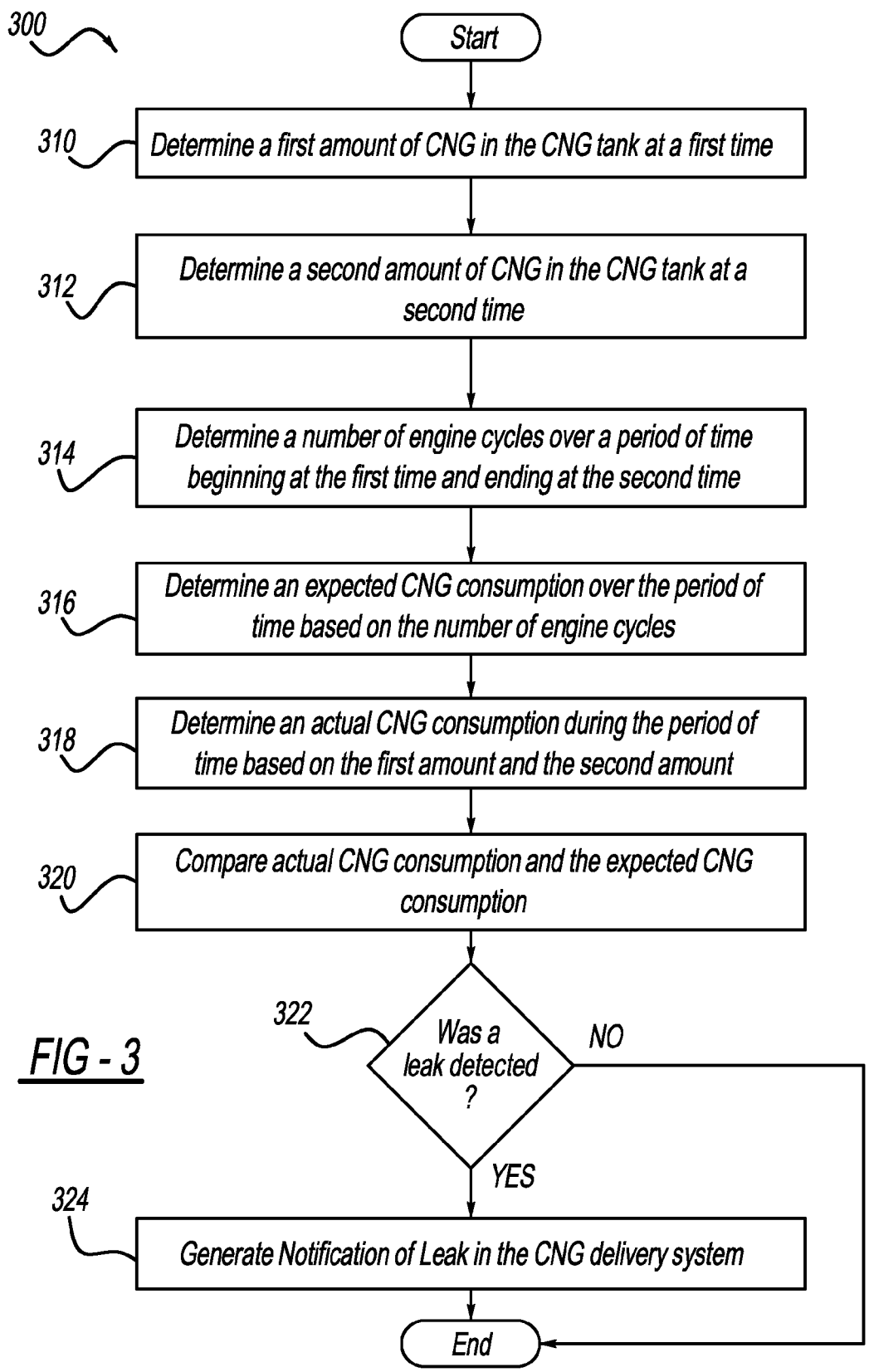
FIG. 3 is a flow chart illustrating an example method for diagnosing a leak in the compressed natural gas delivery system according to some embodiments of the present disclosure.

Referring now to FIG. 3, a flow chart illustrating an example method 300 for diagnosing a leak in the CNG delivery system 100 is illustrated. The method 300 of FIG. 3 can be executed by the leak detection module 150 while the vehicle is in a drive-mode. At operation 310, the leak detection module 150 can determine a first amount of CNG contained in the CNG tank 114 at a first time. The first time may be, for example, when the vehicle is put into a drive mode. It should be appreciated that the first amount of CNG in the CNG tank 114 may be determined in any suitable manner. In some embodiments, the amount of CNG in the CNG tank 114 is equal to the mass of the CNG contained in the CNG tank 114. For example, the mass of CNG can be determined by measuring the tank pressure and the ambient temperature. Using the tank pressure and ambient temperature, the mass of CNG can be determined according to a density variation of the volume of the CNG tank 114. It should be appreciated, the amount of CNG in the CNG tank 114 can be determined in any other suitable manner.

At operation 312, the leak detection module 150 can count the number of engine cycles over a period of time. Each time the cycle control module 152 initiates an engine cycle, the cycle control module 152 may provide an indication thereof to the leak detection module 150. The leak detection module 150 may wait for the cycle control module 152 to initiate a predetermined number of engine cycles, e.g., 5000 engine cycles, or may count the total number of engine cycles over a predetermined amount of time, e.g., 5 minutes. At operation 314, the leak detection module 150 can determine a second amount of CNG in the CNG tank 114 at the end of the period of time. It should be appreciated that the second amount of CNG can be determined in the same manner as the first amount of CNG.

At operation 316, the leak detection module 150 determines an expected CNG consumption over the period of time based on the number of engine cycles that were initiated by the cycle control module 152. The expected CNG consumption can be determined in any suitable manner. In some embodiments, the leak detection module 150 can calculate the expected CNG consumption based on the number of engine cycles and the amount of CNG that is used per engine cycle. For example, the expected CNG consumption may be calculated as the product of the number of engine cycles and the amount of CNG that is used per engine cycle.

Alternatively, the leak detection module 150 can obtain the expected CNG consumption from a lookup table stored in the datastore 154 based on the number of engine cycles that were performed and/or any other engine operating conditions. In these embodiments, the lookup table may index different expected CNG consumption values as functions of the numbers of initiated engine cycles. In some embodiments, the expected CNG consumption values stored in the lookup table are further based on use factors, such as the age of the vehicle or the total mileage accumulated by the vehicle, thereby accounting for any decreases in the efficiency of the CNG delivery system 100 as the vehicle ages. In these embodiments, a machine learning algorithm may be implemented to determine the effect that time and/or total mileage have on the expected CNG consumption values. In an exemplary embodiment, an adaptive neural network can be implemented to determine the expected CNG consumption values. It should be appreciated, however, that other machine learning techniques may also be utilized in addition to or in place of the adaptive neural network technique.

At operation 318, the leak detection module 150 determines an actual CNG consumption. In some embodiments, the leak detection module 150 can determine the actual CNG consumption by integrating the delivered fuel mass (e.g., mg/charge/cylinder) and recording the change in CNG tank pressure. The actual CNG consumption can be determined based on the result of the integration and the change in CNG tank pressure. It should be appreciated that the leak detection module 150 can determine the actual CNG consumption in any other suitable manner. For example, the leak detection module 150 can determine a difference between the first CNG amount and a second CNG amount.

At operation 320, the leak detection module 150 can compare the actual CNG consumption with the expected CNG consumption. In some embodiments, the leak detection module 150 determines whether the actual CNG consumption is greater than the expected CNG consumption, and if so, the leak detection module 150 determines a difference between the actual CNG consumption and the expected CNG consumption. The leak detection module 150 determine whether a leak is detected based on the comparison, as shown at operation 322. For example, the leak detection module 150 can determine that a leak exists if the actual CNG consumption is outside a predetermined tolerance for a given engine cycle, e.g., greater than 3%, or greater than the expected CNG consumption by more than a predetermined amount, e.g., greater than 2 mg/sec/cycle. If the actual CNG consumption is outside the predetermined tolerance or greater than the expected CNG consumption by more than the predetermined amount, the leak detection module 150 can generate a notification indicating that a leak was detected in the CNG delivery system 100, as shown at operation 324. The notification may be communicated to a driver of the vehicle and/or stored in the datastore 154. If a leak is not detected, the leak detection module 150 may stop executing the method 300.

The method 300 of FIG. 3 is provided for example and is not intended to be limiting. Furthermore, the ordering of the operations described with respect to the method 300 is not mandatory and variations are contemplated. Additionally, it is appreciated that some of the operations may be combined into a single operation, while other operations may be performed in several sub-operations.

Figure 4A:
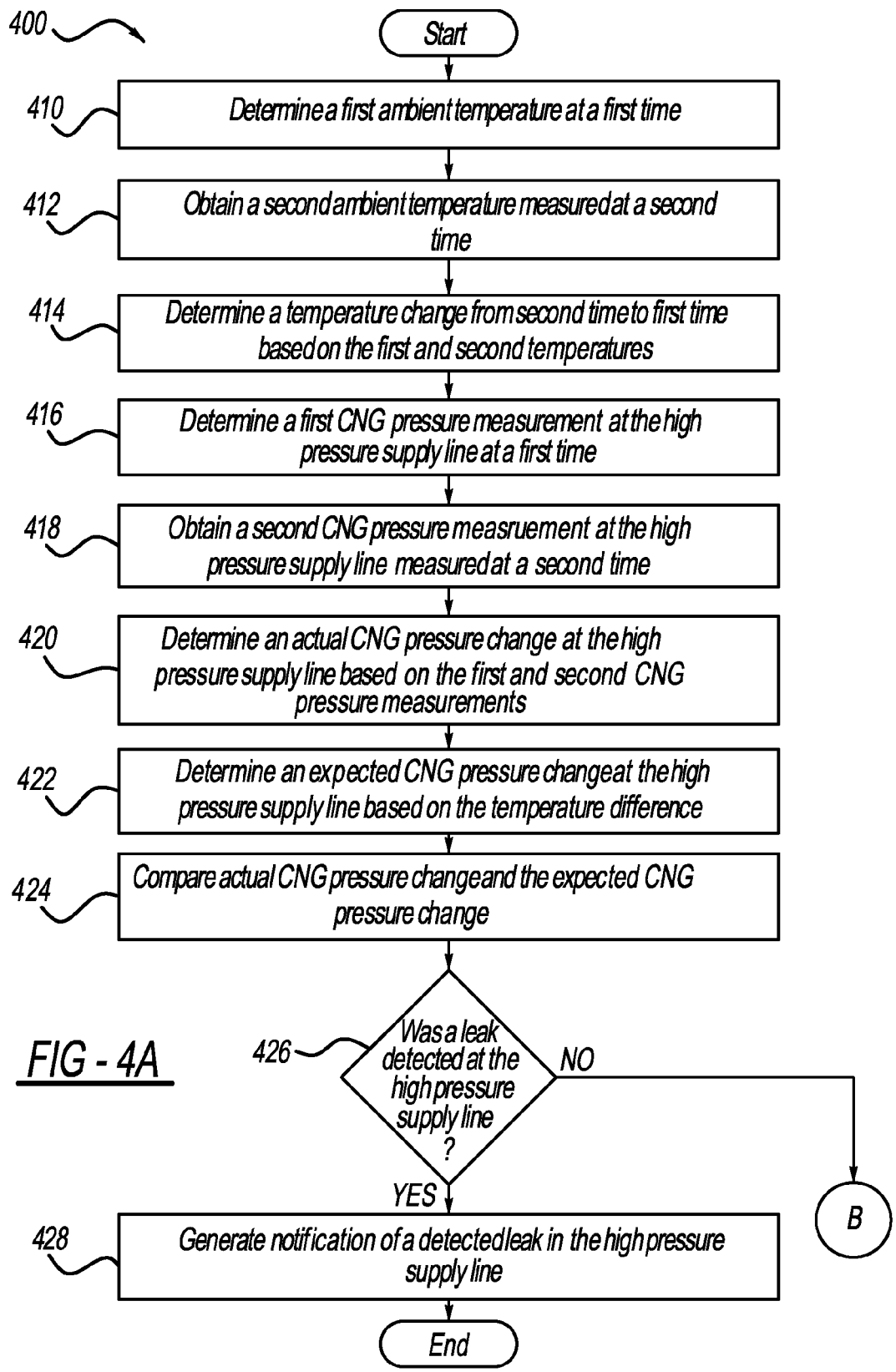
FIGS. 4A and 4B are a flow chart illustrating an example method for diagnosing a leak in the compressed natural gas delivery system according to some embodiments of the present disclosure.
Figure 4B:
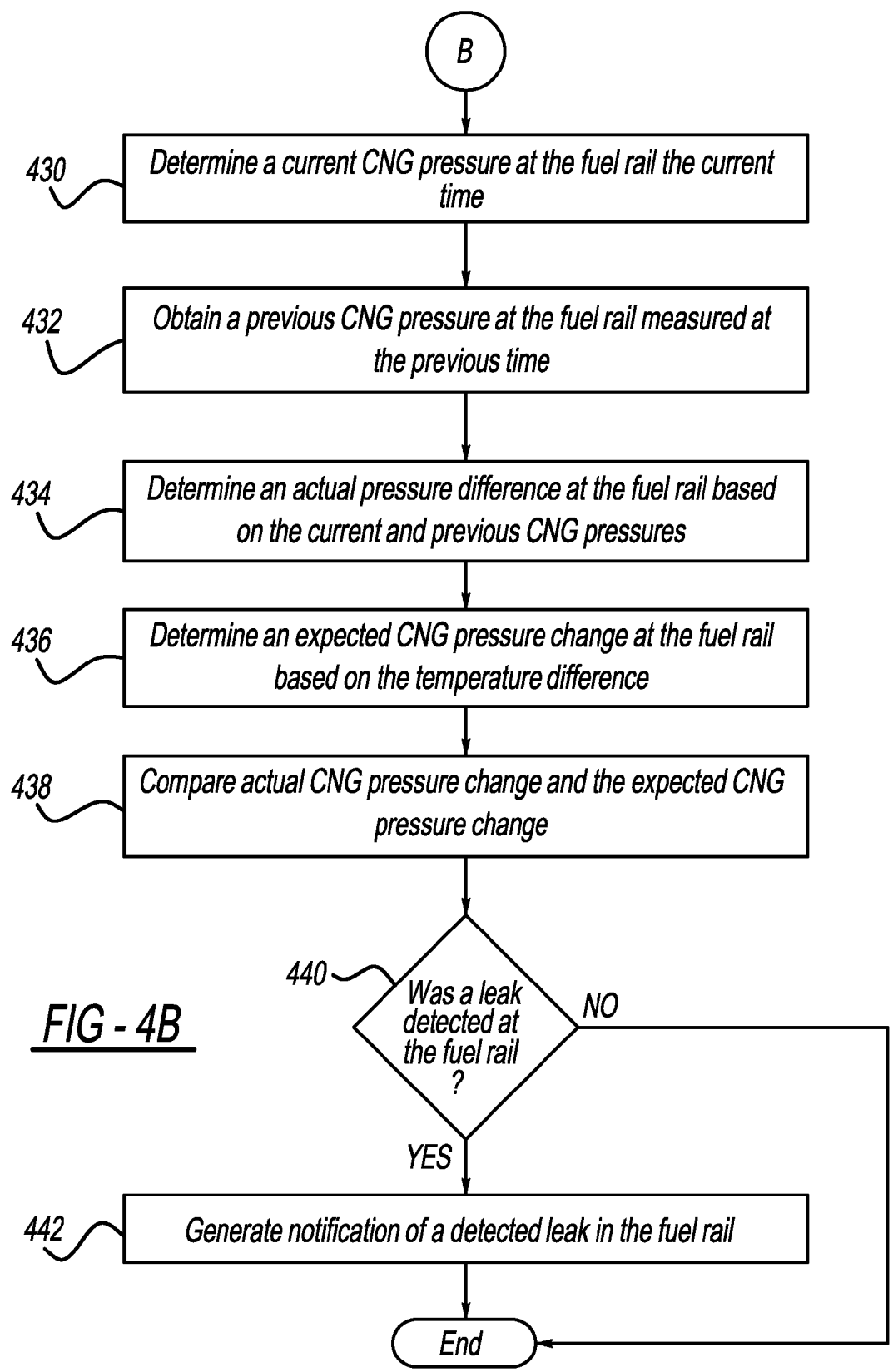

Referring now to FIG. 4, a flow chart illustrating another example method 400 for diagnosing a leak in the CNG delivery system 100 is illustrated. The disclosed method 400 can be performed by the leak detection module 150 when the engine 122 of the vehicle is turned on.

At operation 410, the leak detection module 150 determines a first ambient temperature at a first time. The first time corresponds to a time when the engine 122 is turned on. In the illustrative embodiment, the leak detection module 150 obtains the ambient temperature from the ambient temperature sensor 130. At operation 412, the leak detection module 150 obtains a second ambient temperature measured at a second time, the second time being previous to the first time. The second time may correspond to a time when the engine 122 was last turned off. In some embodiments, the leak detection module 150 obtains the second ambient temperature from the datastore 154. At operation 414, the leak detection module 150 determines a temperature change ($\Delta T$) from the second time to the first time. As should be appreciated, $\Delta T$ represents the difference in temperature from when the engine 122 was last turned off to when the engine 122 was turned back on.

At operation 416, the leak detection module 150 determines a first CNG pressure measurement at the high pressure supply line 124 at the first time. The CNG pressure measurement at the high pressure supply line 124 can be measured from the regulator pressure sensor 132. At operation 418, the leak detection module 150 obtains a second CNG pressure measurement at the high pressure supply line 124 at the second time. The leak detection module 150 can obtain the second CNG pressure measurement at the high pressure supply line 124 from the datastore 154. At operation 420, the leak detection module 150 determines an actual CNG pressure change, $\Delta P_{Actual}$, at the high pressure supply line 124 over a period of time beginning at the second time and ending at the first time. As should be appreciated, $\Delta P_{Actual}$ represents the change in pressure at the high pressure supply line 124 from when the engine 122 was previously turned off to when the engine 122 was turned back on.

At operation 422, the leak detection module 150 determines an expected CNG pressure change, $\Delta P_{Expected}$, at the high pressure supply line 124 based on the temperature change. In some embodiments, the leak detection module 150 can obtain the $\Delta P_{Expected}$ from a lookup table stored in the datastore 154. The lookup table can relate different $\Delta T$ values to corresponding $\Delta P_{Expected}$ values. The contents of the lookup table can be learned heuristically or can be pre-calculated using known techniques.

At operation 424, the leak detection module 150 compares $\Delta P_{Actual}$ at the high pressure supply line 124 with $\Delta P_{Expected}$ at the high pressure supply line 124. At operation 426, the leak detection module 150 determines whether a leak has been diagnosed in the high pressure supply line 124 based on the comparison. For example, a leak can be diagnosed in the high pressure supply line 124 if $\Delta P_{Actual}$ is greater than $\Delta P_{Expected}$ by more than a predetermined tolerance or amount. If a leak is diagnosed in the high pressure supply line, the leak detection module 150 can generate a notification indicating the existence of the leak, as shown at 426, and the method 400 may stop executing. If a leak is not detected, the method 400 may continue to execute.

At operation 430, the leak detection module 150 determines a first CNG pressure measurement at the fuel rail 128 at the first time. The CNG pressure measurement at the fuel rail 128 can be measured from the rail pressure sensor 134. It should be appreciated the operation 430 may be performed substantially the same time as operation 410 and/or operation 416. At operation 432, the leak detection module 150 obtains a second CNG pressure measurement at the fuel rail 128 at the second time. The leak detection module 150 can obtain the second CNG pressure measurement at the fuel rail 128 from the datastore 154. At operation 434, the leak detection module 150 determines an actual CNG pressure change, $\Delta P_{Actual}$, at the fuel rail 128 over the period of time beginning at the second time and ending at the first time.

At operation 436, the leak detection module 150 determines an expected CNG pressure change, $\Delta P_{Expected}$, at the fuel rail 128 based on the temperature change. As was described above, the leak detection module 150 can obtain the $\Delta P_{Expected}$ from a lookup table stored in the datastore 154. At operations 434 and 436, the leak detection module 150 compares $\Delta P_{Actual}$ and $\Delta P_{Expected}$ at the fuel rail 128 to determine whether a leak is detected at the fuel rail 128. If a leak is detected, the leak detection module 150 can generate a notification indicating that a leak has been diagnosed in the fuel rail, as shown at operation 438. The notification may be communicated to a driver of the vehicle and/or stored in the datastore 154. If a leak is not detected, the leak detection module 150 may stop executing the method 400.

In the method 400 of FIG. 4, the leak detection module 150 can diagnose leaks at one or more predetermined sections of the CNG delivery system 100. In the example provided in FIG. 4, the leak detection module 150 is configured to diagnose leaks at the high pressure supply line 124 and at the fuel rail 128. It should be appreciated from the disclosure, however, that the leak detection module 150 can be configured to diagnose leaks at other components of the CNG delivery system 100 as well.

Furthermore, the leak detection module 150 may be configured to perform one or more diagnostics prior to executing the method 400. For example, the leak detection module 150 may compare a rail temperature measurement obtained from the rail temperature sensor 136 with an ambient temperature measurement obtained from the ambient temperature sensor 130 prior to executing the method 400. As can be appreciated, if the rail temperature is greater than the ambient temperature, then the expected CNG pressure within the rail and/or the high pressure supply line may be affected. Thus, if the rail temperature is greater than the ambient temperature, then the method 400 is not executed.

The method 400 of FIG. 4 is provided for example and is not intended to be limiting. Furthermore, the ordering of the operations described with respect to the method 400 is not mandatory and variations are contemplated. Additionally, it is appreciated that some of the operations may be combined into a single operation, while other operations may be performed in several sub-operations.

Figure 5:
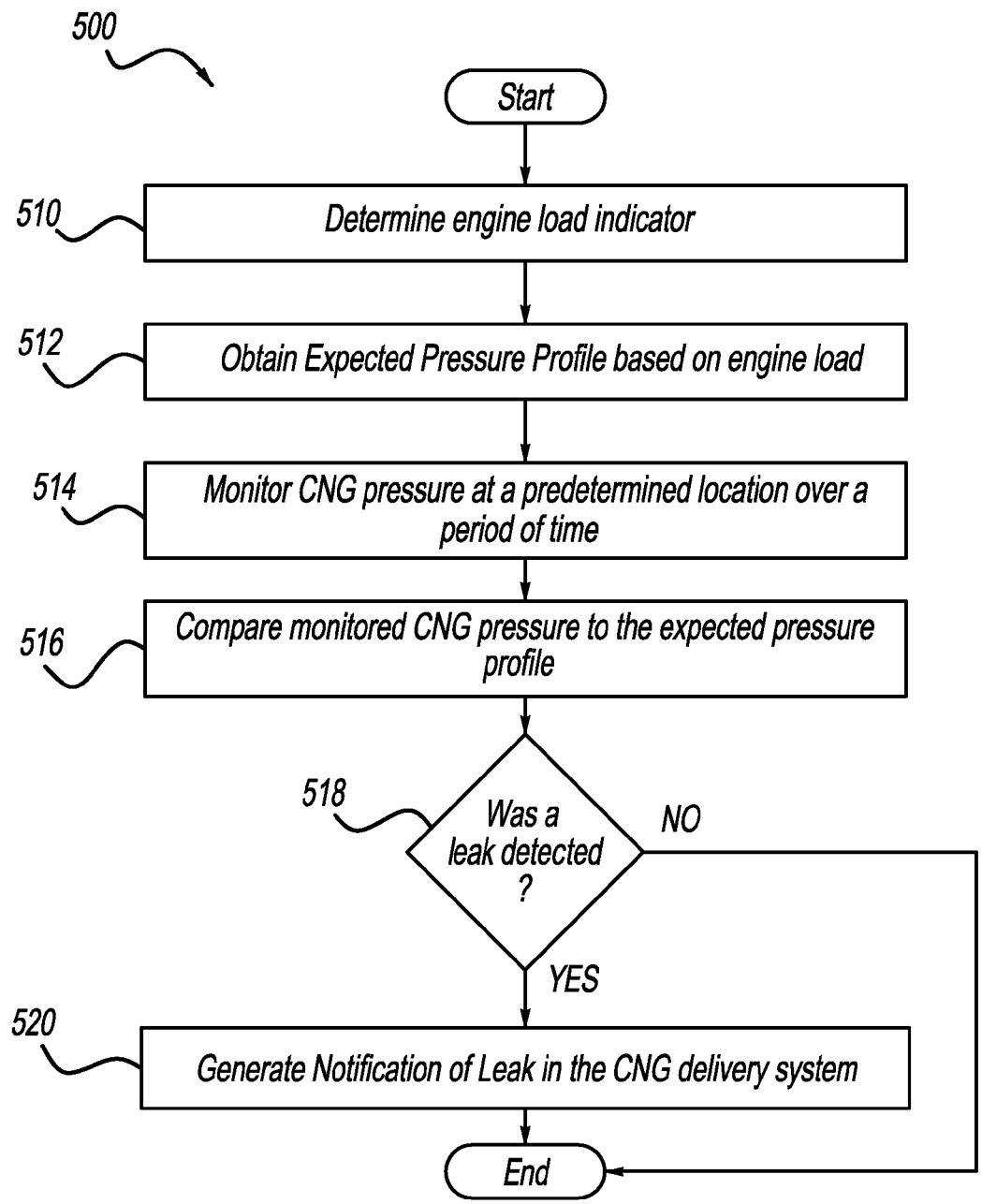
FIG. 5 is a flow chart illustrating an example method for diagnosing a leak in the compressed natural gas delivery system according to some embodiments of the present disclosure.

Referring now to FIG. 5, a flow chart illustrating another example method 500 for diagnosing a leak in the CNG delivery system 100 is illustrated. The disclosed method 500 can be performed by the leak detection module 150 when the vehicle is in a drive mode.

Figure 6A:
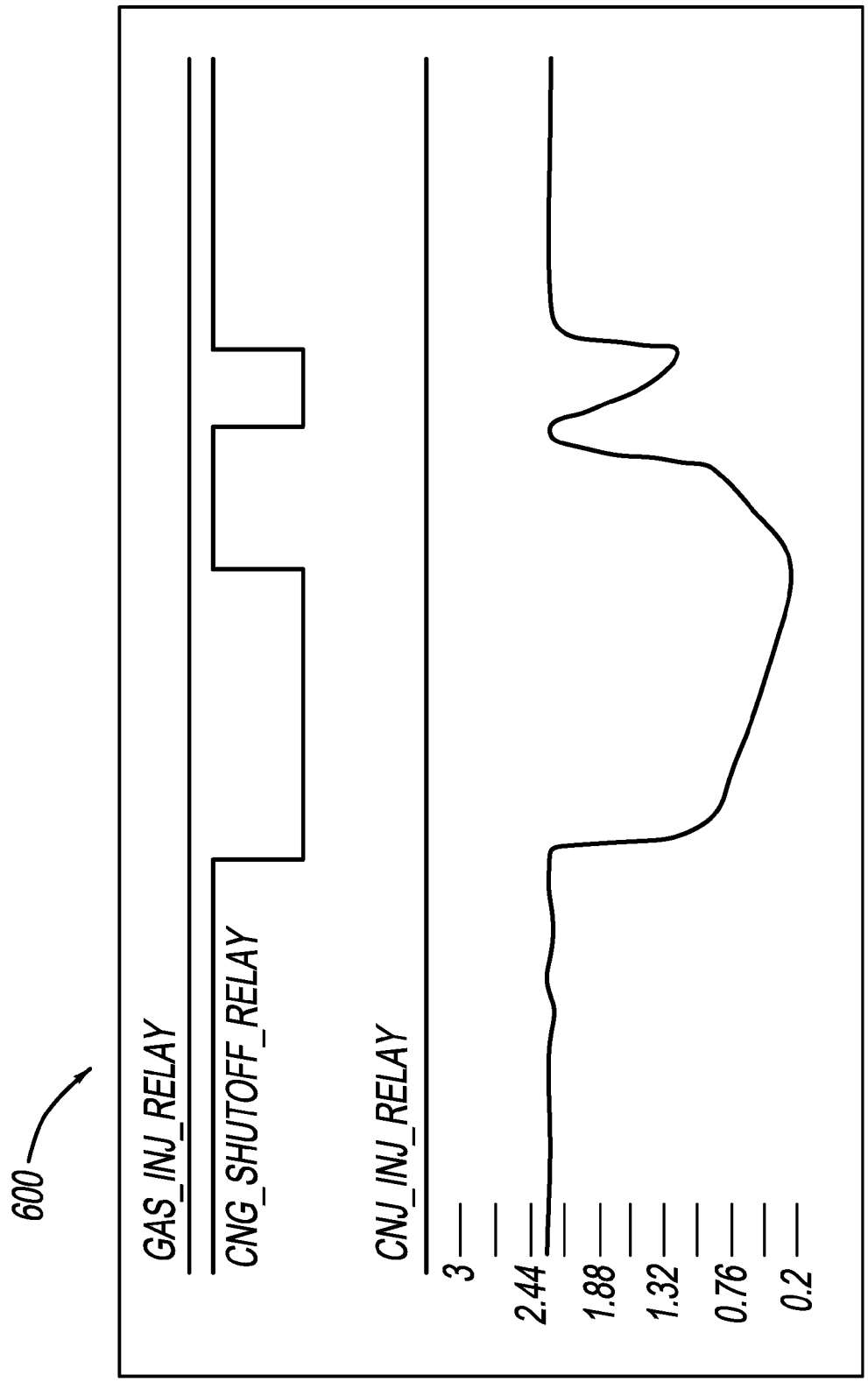
FIG. 6A is a drawing illustrating an example expected pressure profile indicating expected pressure measurements in a leak free natural gas delivery system.

At operation 510, the leak detection module 150 obtains an engine load indicator. An engine load indicator can include, for example, an engine torque and/or a throttle position. The leak detection module 150 can obtain the engine load indicator from the cycle control module 152, which receives such indicators when a driver of the vehicle engages the accelerator of the vehicle. At 512, the leak detection module 150 may retrieve an expected pressure profile from the datastore 154 based on the load indicators. An expected pressure profile defines an expected behavior of CNG pressure measurements over time. The datastore 154 can store a plurality of expected pressure profiles, wherein each of the expected pressure profiles corresponds to a different engine load. FIG. 6A illustrates an example of an expected pressure profile in relation to a power state of the relay. In the illustrative example, the expected pressure profile 600 is related to the pressure at the high pressure supply line 124. The datastore 154 may store expected pressure profiles for other sections of the CNG delivery system 100 as well. According to the example pressure profile 600, when the relay 112 is energized, the CNG pressure at the high pressure supply line 124 is expected to rise sharply. Similarly, when the relay 112 is deenergized, the CNG pressure falls sharply. These types of trends can be used by the leak detection module 150 to diagnose a leak within the CNG delivery system 100.

Figure 6B:
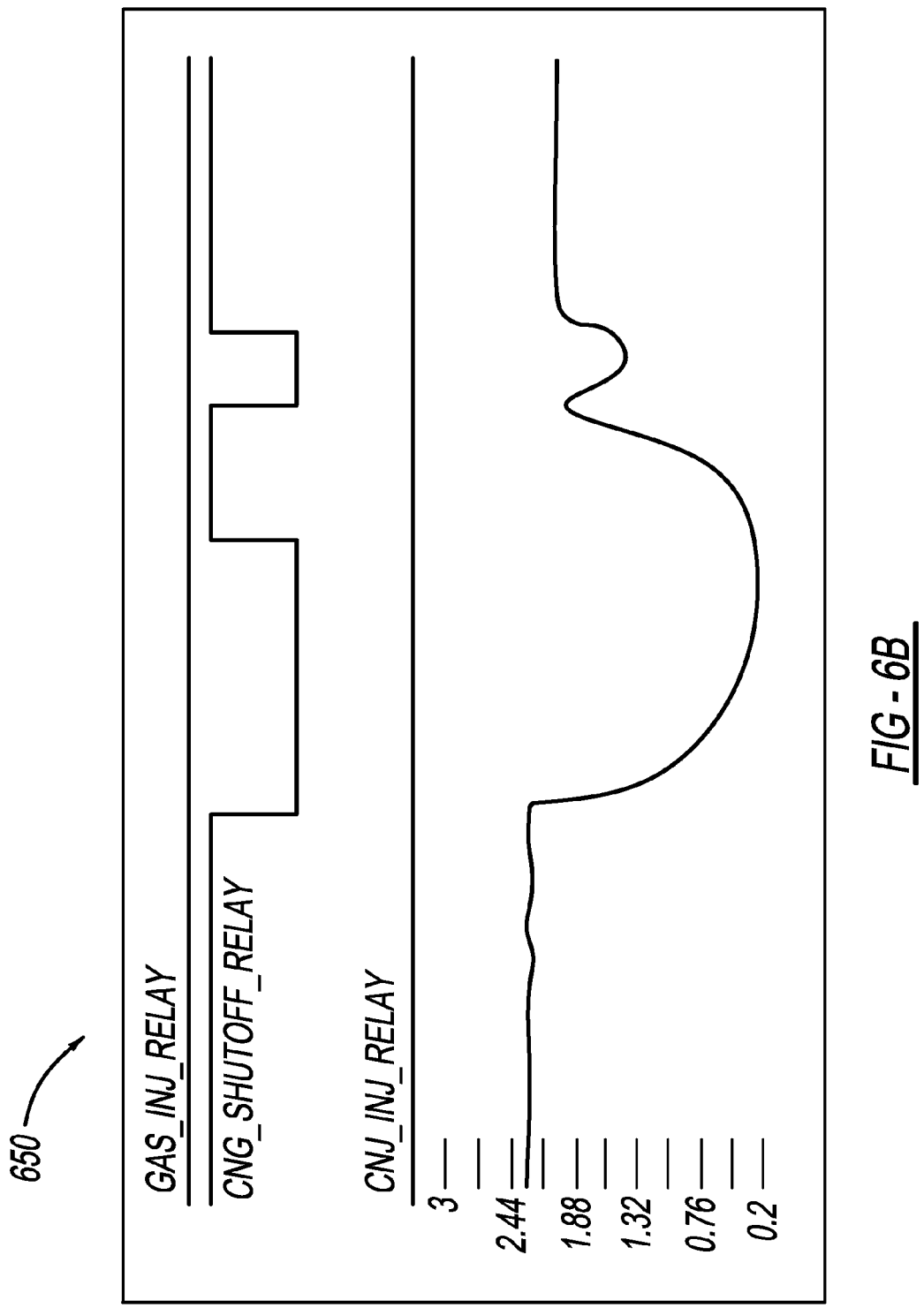
FIG. 6B is a drawing illustrating an example plot of pressure measurements indicating pressure build up and decay rates in a compressed natural gas delivery system having a natural gas leak.

At operation 514, the leak detection module 150 monitors the CNG pressure at a predetermined section over a period of time. In the example provided above, the leak detection module 150 can monitor the CNG pressure at the high pressure supply line 124 by obtaining the CNG pressure measurements from the regulator pressure sensor 132. The leak detection module 150 can plot the CNG pressure measurements against time to define the actual behavior of the CNG pressure. FIG. 6B illustrates an example of a plot 650 of the CNG pressure measurements against time. As can be seen in the plot 650, when the relay was energized, the CNG pressure measurements do not decrease and increase as sharply as the expected CNG pressure measurements in the expected pressure profile 600 (FIG. 6A).

At operation 516, the leak detection module 150 compares the plotted CNG pressure measurements 650 to the expected pressure profile 600 that was retrieved from the datastore 154. At 518, the leak detection module 150 determines whether there is a leak at the predetermined section based on the comparison. In some embodiments, the leak detection module 150 diagnosis a leak at the predetermined section if the plotted CNG pressure measurements fall outside a predetermined tolerance of the expected CNG pressures defined in the pressure profile. For example, if the slope decreases and increases corresponding to decreases and increases in pressure in the plotted CNG pressure measurements are less than the expected slope decreases and increases, then the leak determination module 150 can diagnose a leak at the predetermined section. If the leak detection module 150 diagnoses a leak at the predetermined section, the leak detection module 150 generates a notification indicating a leak at the predetermined section. The notification may be communicated to a driver of the vehicle and/or stored in the datastore 154. Otherwise, the leak detection module 150 may stop executing the method 500.

The method 500 of FIG. 5 is provided for example and is not intended to be limiting. Furthermore, the ordering of the operations described with respect to the method 500 is not mandatory and variations are contemplated. Additionally, it is appreciated that some of the operations may be combined into a single operation, while other operations may be performed in several sub-operations.

As used herein, the term module may refer to, be part of, or include: an Application Specific Integrated Circuit (ASIC); a digital signal processor (DSP); an electronic circuit; a combinational logic circuit; a field programmable gate array (FPGA); a processor or a distributed network of processors (shared, dedicated, or grouped) that execute(s) code or a process; electronic controller unit (ECU) that may include one or more microprocessors and/or microcontrollers; or other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

What is claimed is:

1. A method for detecting a leak in a compressed natural gas (CNG) delivery system of a vehicle having an engine, the method comprising:
   measuring a first pressure of CNG in a CNG tank of the vehicle at a first time;
   measuring a second pressure of CNG in the CNG tank of the vehicle at a second time, the second time being subsequent to the first time;
   determining a change in CNG tank pressure by calculating a difference between the first pressure and the second pressure;
   determining an expected CNG consumption of the vehicle during a period of time, the period of time beginning at the first time and ending at the second time;
   determining a delivered fuel mass supplied to the engine by the CNG delivery system in terms of mass of CNG per charge per cylinder of the engine;
   integrating the delivered fuel mass over the period of time;
   determining an actual CNG consumption during the period of time based on the integrated delivered fuel mass and the change in CNG tank pressure; and
   comparing the actual CNG consumption and the expected CNG consumption to determine whether a leak has occurred.

2. The method of claim 1, wherein determining the expected CNG consumption includes counting a number of engine cycles over the period of time, wherein the expected CNG consumption is based on the number of engine cycles and an expected amount of CNG that is used per engine cycle.

3. The method of claim 2, wherein the expected CNG consumption is determined from a lookup table that relates numbers of engine cycles to expected CNG consumption values.

4. The method of claim 3, wherein the lookup table further relates use factors of the vehicle to the expected CNG consumption values, the use factors being indicative of at least one of different ages of the vehicle and different mileages of the vehicle.

5. The method of claim 1, wherein the leak is detected when the actual CNG consumption is greater than the expected CNG consumption.

6. The method of claim 1, wherein the leak is detected when a difference between the actual CNG consumption and the expected CNG consumption is greater than a threshold.

7. The method of claim 1, wherein the method is executed while the vehicle is in a drive mode.

8. The method of claim 1, further comprising generating a notification when the leak is detected.

* * * * *